UNITED STATES PATENT OFFICE.

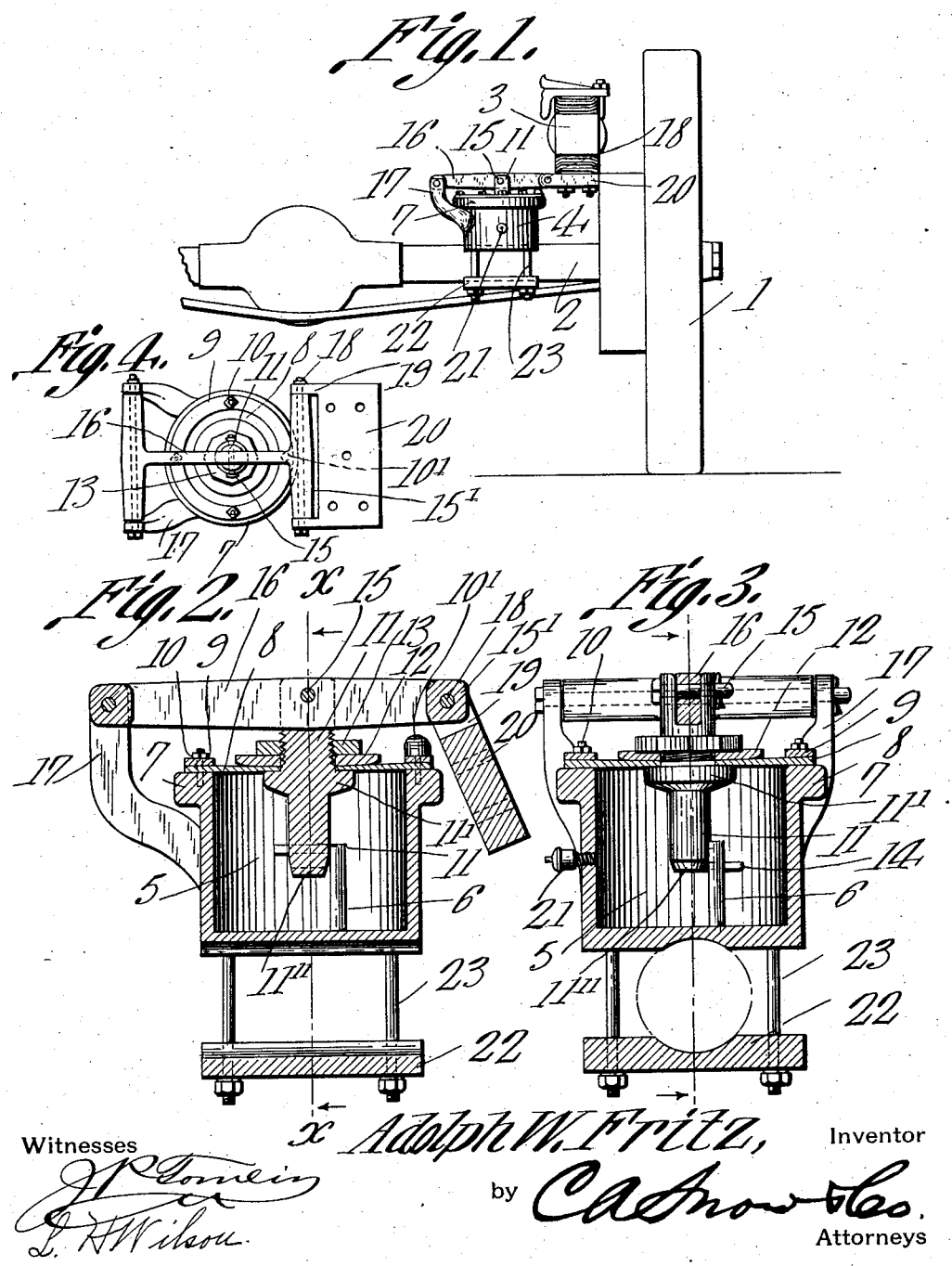

ADOLPH W. FRITZ, OF BURLINGTON, IOWA.

PNEUMATIC SPRING.

1,009,498.   Specification of Letters Patent.   Patented Nov. 21, 1911.

Application filed May 29, 1911. Serial No. 630,076.

*To all whom it may concern:*

Be it known that I, ADOLPH W. FRITZ, a citizen of the United States, residing at Burlington, in the county of Des Moines and State of Iowa, have invented a new and useful Pneumatic Spring, of which the following is a specification.

This invention relates to an improvement in pneumatic springs for vehicles, the primary object of the invention being the provision of an air or pneumatic spring forming a suspension between the axle and body of a vehicle, that will dispense with the use of pneumatic tires, permitting the use of solid rubber or steel tired wheels upon vehicles, such for instance as motor cars and automobiles.

A further object of the present invention is the provision of a device adapted to be interposed between the vehicle body and its supporting spring, and the axle, whereby all shocks occasioned by irregularities in the surface traversed by the vehicle or automobile, will be cushionedly retarded and will not jar the body of the said vehicle or automobile, and thus take the place of the costly pneumatic tires in general use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings:—Figure 1 is a view illustrating the use of the pneumatic spring. Fig. 2 is a vertical section through the casing of the invention. Fig. 3 is a section on line X—X of Fig. 2. Fig. 4 is a top plan view on a reduced scale.

Referring to the drawing, the numeral 1 designates the rear wheel of a motor driven vehicle or automobile, 2 the rear axle casing thereof, and 3, the body spring, while operably disposed between said spring and the axle casing is the improved pneumatic spring or suspension device 4. This suspension device, comprises primarily the cylindrical casing having the chamber 5 with a closed lower end, a limiting hook 6 being mounted therein, the purpose of which will presently appear. The upper edge is provided with a circumferential flange 7, to receive the flexible or elastic diaphragm or cushioning plate 8, which is held stretched over the open end of the chamber 5, by means of the circular ring or clamping band 9, and the set screws or bolts 10 and 10', the bolt 10', carrying a bumper, the purpose of which will appear later.

The diaphragm operating pin 11, is provided with the annular shoulder 11' within the chamber, and is adapted to form with the disk 12 and clamping nut 13, an airtight connection for the pin 11 at the connection of the pin 11 with the diaphragm. The pin 11 is provided with the tapered lower end 11''. The pin 14 is carried at right-angles to the body of the pin near the lower end 11'' thereof, and is adapted to be below and in the path of the hook 6, so that the upward movement of pin 11 and the diaphragm is thus checked or limited.

The lever 16 is connected pivotally at 15, to the upper free end of the pin 11, and has one end pivoted in the upper end of the bracket 17, carried by the casing 4, while at its other end its sleeve 15', is pivoted by means of the pin or rod 18, to the lugs 19, of the spring engaging plate 20, which although shown as attached to the spring 3, in this instance, may be attached directly to the body of the vehicle.

To secure the casing 4 to the axle casing 2, the clamping plate 22 and bolts 23 are employed.

In order to limit the lower movement of the lever 16, so as not to unnecessarily jar the spring, or the suspension device when the other free end of the lever is lowered, the bumper 10' is located in the path thereof, and thus prevents the lever from jarring the top of the casing and acts as a supplementary cushion therefor.

In the side of the casing 4, is provided a capped port 21, by means of which air is supplied at the desired pressure to the chamber 5 of the device, and thus the diaphragm is held at the proper suspending pressure to insure the proper retardation of the action of the vehicle between its wheel and axle casing and the vehicle body, thus insuring an easy riding vehicle, and dispensing with pneumatic tired wheels.

What is claimed, is:—

A suspension device for vehicles, comprising a chambered air containing cylinder, means for admitting air under pressure thereto and sealing the air therein, a diaphragm closing one end of the cylinder and cushionedly supported by the injected air within the chamber of the cylinder, a plunger connected to the diaphragm and projecting upon both sides of the diaphragm, a pin carried by its lower end within the cylinder, a hook mounted in the cylinder to engage said pin to limit the upward movement of the plunger and diaphragm, and a lever pivoted to the upper end of the plunger.

In testimony that I claim the foregoing as my own, I have hereto affixed my signature in the presence of two witnesses.

ADOLPH W. FRITZ.

Witnesses:
 ADOLPH H. LUTH,
 FRANK J. MENNEN.

Copies of this patent may be obtained for five cents each, by addressing the "Commissioner of Patents, Washington, D. C."